United States Patent
Park et al.

(10) Patent No.: US 8,786,204 B2
(45) Date of Patent: Jul. 22, 2014

(54) DC/DC CONVERTER AND DRIVING APPARATUS HAVING THE SAME

(75) Inventors: Sang Gab Park, Gyunggi-do (KR); Nam Jin Park, Gyunggi-do (KR); Heung Gyoon Choi, Gyunggi-do (KR); Han Hee Lee, Gyunggi-do (KR); Hyo Joong An, Busan (KR); Kyu Min Park, Gyunggi-do (KR); Su Hun Jo, Gyunggi-do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 91 days.

(21) Appl. No.: 13/420,229

(22) Filed: Mar. 14, 2012

(65) Prior Publication Data

US 2013/0169180 A1    Jul. 4, 2013

(30) Foreign Application Priority Data

Dec. 28, 2011    (KR) .................. 10-2011-0144821

(51) Int. Cl.
*H05B 37/02*    (2006.01)
*G06F 3/038*    (2013.01)

(52) U.S. Cl.
USPC ............ 315/206; 315/200 R; 315/185 R; 315/201; 345/212; 345/213

(58) Field of Classification Search
USPC ............ 315/200 R, 185 R, 201, 206, 210, 315/151–152, 291, 294, 297, 301, 307; 345/213, 212, 6; 363/15, 16, 312, 98, 363/21.02, 50
See application file for complete search history.

(56) References Cited

U.S. PATENT DOCUMENTS

| | | | |
|---|---|---|---|
| 6,028,776 A | 2/2000 | Ji et al. | |
| 2005/0017922 A1* | 1/2005 | Devos et al. | 345/6 |
| 2008/0129220 A1* | 6/2008 | Shteynberg et al. | 315/291 |
| 2008/0284400 A1* | 11/2008 | Oettinger et al. | 323/283 |
| 2009/0244934 A1 | 10/2009 | Wang et al. | |
| 2010/0164403 A1* | 7/2010 | Liu | 315/297 |
| 2010/0327765 A1* | 12/2010 | Melanson et al. | 315/291 |

FOREIGN PATENT DOCUMENTS

| | | |
|---|---|---|
| KR | 10-2006-0010577 A | 2/2006 |
| KR | 10-2007-0049735 A | 5/2007 |
| KR | 10-2009-0071861 A | 7/2009 |
| WO | WO 2007/055519 A1 | 5/2007 |

OTHER PUBLICATIONS

Office Action issued in Korean Patent Appplication No. 10-2011-0144821 dated Feb. 27, 2013.

* cited by examiner

*Primary Examiner* — Vibol Tan
(74) *Attorney, Agent, or Firm* — McDermott Will & Emery LLP

(57) ABSTRACT

There are provided a DC/DC converter and a driving apparatus having the same. The DC/DC converter includes a DC/DC converter part converting an input power into a predetermined DC power by switching the input power to thereby supply the converted DC power to a light emitting device; and a control part controlling switching of the DC/DC converter part in accordance with a driving signal applied to the light emitting device to thereby control a voltage level of the DC power.

12 Claims, 4 Drawing Sheets

DC/DC CONVERTER AND DRIVING APPARATUS HAVING THE SAME

CROSS-REFERENCE TO RELATED APPLICATIONS

This application claims the priority of Korean Patent Application No. 10-2011-0144821 filed on Dec. 28, 2011, in the Korean Intellectual Property Office, the disclosure of which is incorporated herein by reference.

BACKGROUND OF THE INVENTION

1. Field of the Invention

The present invention relates to a DC/DC converter for driving a light emitting device and a driving apparatus having the same.

2. Description of the Related Art

In recent years, with developments in flat panel display technologies, flat panel displays have even been used in automobile instrument panels, as well as smart phones, game machines, and digital cameras, and are expected to be widely used in daily life in the form of various devices such as ultra-thin televisions (TV), transparent navigation devices, and the like.

As a flat panel display, a thin film transistor liquid crystal display (TFT-LCD) may mainly be used.

However, since the TFT-LCD requires a separate light source, the TFT-LCD has limitations in aspects thereof, such as accompanying ultra-thinness, ensuring viewing angle, and the like.

Accordingly, as a flat panel display that will be placed on the market in the future, an active-matrix organic light emitting diode (OLED) display may be widely used instead of the TFT-LCD as it has a wider viewing angle, a higher chroma value, and a faster response time, as well as not requiring a separate light source.

That is, among OLEDs, in the case of the active-matrix OLED, a response speed to moving images is measured using a microsecond (us) unit equal to $1/1{,}000{,}000$ of a second. This is 1,000 times faster than the TFT-LCD having a response speed measured by a millisecond unit (ms), equal to $1/1{,}000$ of a second, such that afterimage, problematic in the TFT-LCD, may be overcome.

In addition, since the active-matrix OLED is a self-illuminating type flat panel display, it does not require a backlight unit emitting light from a rear surface thereof unlike the TFT-LCD, such that the thickness and weight thereof may be reduced by $1/3$, as compared to the TFT-LCD. Also, in contrast to the TFT-LCD, the active-matrix OLED has constant color reproducibility at high and low temperatures, and is a self-illuminating type flat panel display, so that a contrast ratio thereof is not changed through brightness or viewing angle.

In recent years, OLEDs have increasingly been used due to various advantages such as relatively low power consumption, relatively long life spans, environmental friendliness, and the like.

A driving apparatus for driving the OLED generally uses an AC/DC conversion circuit and a multi-stage DC/DC conversion circuit, and the multi-stage DC/DC conversion circuit may lead to problems such as a power conversion loss, an increase in manufacturing costs and the volume of the circuit due to the added converter, and the like, in a process of converting a voltage required for driving the OLED.

Also, the reliability of products, such as an active/passive device, an integrated circuit (IC), and the like, adopted in the DC/DC conversion circuit may be reduced.

SUMMARY OF THE INVENTION

An aspect of the present invention provides a DC/DC converter that may include an AC/AC conversion terminal and a single DC/DC conversion terminal without adopting an additional DC/DC conversion terminal to thereby drive a light emitting device, and a driving apparatus having the same.

According to an aspect of the present invention, there is provided a DC/DC converter for an organic light emitting diode (OLED), the DC/DC converter including: a DC/DC converter part converting an input power into a predetermined DC power by switching the input power to thereby supply the converted DC power to a light emitting device; and a control part controlling switching of the DC/DC converter part in accordance with a driving signal applied to the light emitting device to thereby control a voltage level of the DC power.

The DC/DC converter part may include a switching part switching the input power in accordance with a switching control of the control part; a transformer having a primary winding receiving the switched power from the switching part, and a secondary winding having a predetermined winding ratio with regard to the primary winding and outputting a power transformed in accordance with the winding ratio; and a rectification part having a synchronous rectification element rectifying the transformed power from the secondary winding of the transformer.

The control part may be synchronized with a switching control of the switching part to thereby control ON/OFF switching of the synchronous rectification element of the rectification part.

The control part may include a comparison part comparing a predetermined reference signal with the DC power of the DC/DC converter part and a signal level of the driving signal, and a switching control part controlling the switching of the switching part and the switching of the synchronous rectification element in accordance with a comparison result of the comparison part.

The control part may control switching-on duty of the switching part in accordance with on-time duty of the driving signal.

The switching part may have a phase shift full bridge (PSFB) switch structure or a half bridge switch structure.

According to another aspect of the present invention, there is provided a driving apparatus, including: a power factor correction part switching a rectified power to correct a power factor; a DC/DC converter part switching the power in which the power factor is corrected from the power factor correction part, and converting the switched power into a predetermined DC power to thereby supply the converted DC power to an organic light emitting diode (OLED); and a control part controlling switching of the DC/DC converter part in accordance with a driving signal applied to the OLED to thereby control a voltage level of the DC power.

The DC/DC converter part may include a switching part switching the power in which the power factor is corrected in accordance with a switching control of the control part, a transformer having a primary winding receiving the switched power from the switching part, and a secondary winding having a predetermined winding ratio with regard to the primary winding to thereby output a power transformed in accordance with the winding ratio, and a rectification part having a synchronous rectification element rectifying the transformed power from the secondary winding of the transformer.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
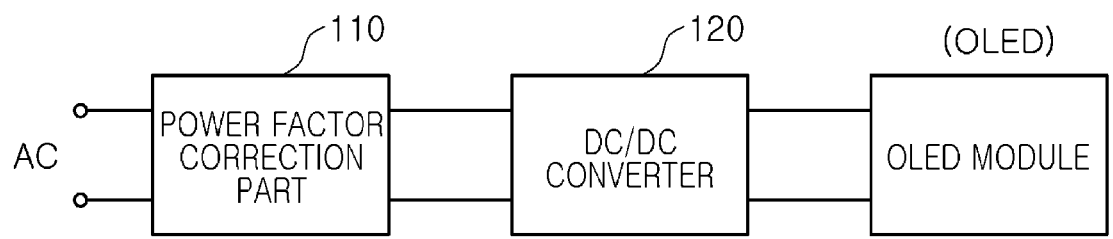
FIG. 1 is a schematic diagram illustrating the configuration of a driving apparatus according to an embodiment of the present invention.

Hereinafter, embodiments will be described in detail with reference to the accompanying drawings so that they can be easily practiced by those skilled in the art to which the present invention pertains.

However, detailed descriptions related to well-known functions or configurations will be ruled out in order not to unnecessarily obscure subject matters of the present invention.

In addition, like reference numerals will be used to describe elements having the same or similar functions throughout the accompanying drawings.

Throughout this specification, it will be understood that when an element is referred to as being "connected to" another element, it can be directly connected to the other element or may be indirectly connected to the other element with element(s) interposed therebetween.

In addition, unless explicitly described to the contrary, the word "comprise" and variations such as "comprises" or "comprising," will be understood to imply the inclusion of stated elements but not the exclusion of any other elements.

Embodiments of the present invention will now be described in detail with reference to the accompanying drawings.

FIG. 1 is a schematic diagram illustrating the configuration of a driving apparatus according to an embodiment of the present invention.

Referring to FIG. 1, a driving apparatus 100 according to an embodiment of the present invention may include a power factor correction part 110 and a DC/DC converter 120.

The power factor correction part 110 may receive and rectify an AC power, and adjust a phase difference between a current and a voltage by switching the rectified power to thereby correct a power factor.

The corrected power may be transmitted to the DC/DC converter 120.

The DC/DC converter 120 may convert the corrected DC power into a predetermined driving power, and transmit the converted driving power to a light emitting device module including a light emitting device, particularly, an organic light emitting diode (OLED) module including an OLED.

The OLED module may be supplied with the driving power, and may be driven in accordance with a driving signal.

As described above, the driving apparatus 100 according to the embodiment of the present invention does not adopt a separate DC/DC conversion terminal for supplying a required driving power to the light emitting device module including the light emitting device, particularly, the OLED module including the OLED, so that power conversion efficiency may be increased, and a circuit size and manufacturing costs may be reduced.

Figure 2:
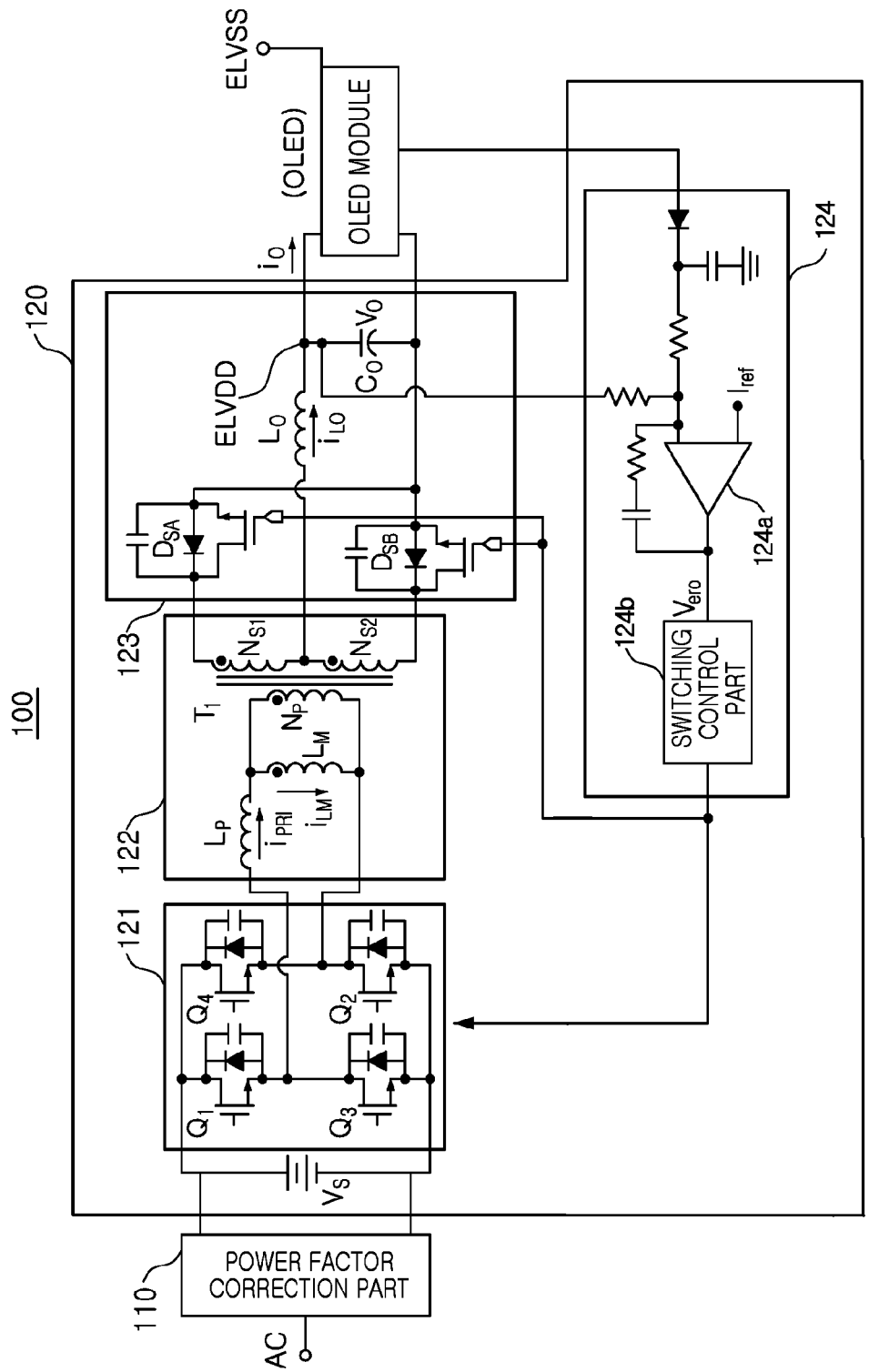
FIG. 2 is a circuit diagram illustrating a driving apparatus according to an embodiment of the present invention, in detail.

FIG. 2 is a circuit diagram illustrating a driving apparatus according to an embodiment of the present invention, in detail.

Referring to FIG. 2, the power factor correction part 110 is the same as that of FIG. 1, and thus, detailed description thereof will be omitted.

The DC/DC converter 120 may include a DC/DC converter part 121, 122, and 123 and a control part 124.

The DC/DC converter part may include a switching part 121, a transformer 122, and a rectification part 123.

The switching part 121 may have a Phase Shift Full Bridge (PSFB) switch structure having four switches Q1, Q2, Q3, and Q4, and the four switches Q1, Q2, Q3, and Q4 may be switched on and off in accordance with a switching control of the control part 124.

The transformer 122 may include a primary winding $N_P$ and a secondary winding $N_{S1}$ and $N_{S2}$, and the primary winding $N_P$ and the secondary winding $N_{S1}$ and $N_{S2}$ may form a predetermined winding ratio therebetween.

The primary winding $N_P$ may receive a switched power from the switching part 121, and the secondary winding $N_{S1}$ and $N_{S2}$ may have a center tap and allow the switched power to have a voltage level transformed in accordance with the predetermined winding ratio with regard to the primary winding $N_P$ and output the same.

The rectification part 123 may include two synchronous rectification elements $D_{SA}$ and $D_{SB}$ connected to one end and the other end of the secondary winding $N_{S1}$ and $N_{S2}$, and may be synchronized with a control of the switching part 12 by the control part 124 to be switched on and off, thereby rectifying the output power from the secondary winding $N_{S1}$ and $N_{S2}$.

In addition, the rectification part 123 may include an inductor (Lo) connected to the center tap of the secondary winding $N_{S1}$ and $N_{S2}$ and a capacitor (Co) to stabilize the rectified power (Vo), thereby providing the driving power ELVDD to the OLED module.

The control part 124 may include a comparison part 124a and a switching control part 124b.

The comparison part 124a may compare the driving power ELVDD supplied to the OLED module and a driving signal controlling brightness of the OLED module with a predetermined reference current level Iref, and transmit the compared result to the switching control part 124b.

The switching control part 124b may provide a pulse width modulation (PWM) signal allowing the switching part 121 and the synchronous rectification elements $D_{SA}$ and $D_{SB}$ of the rectification part 123 to be on and off in accordance with the comparison result from the comparison part 124a.

Figure 3:
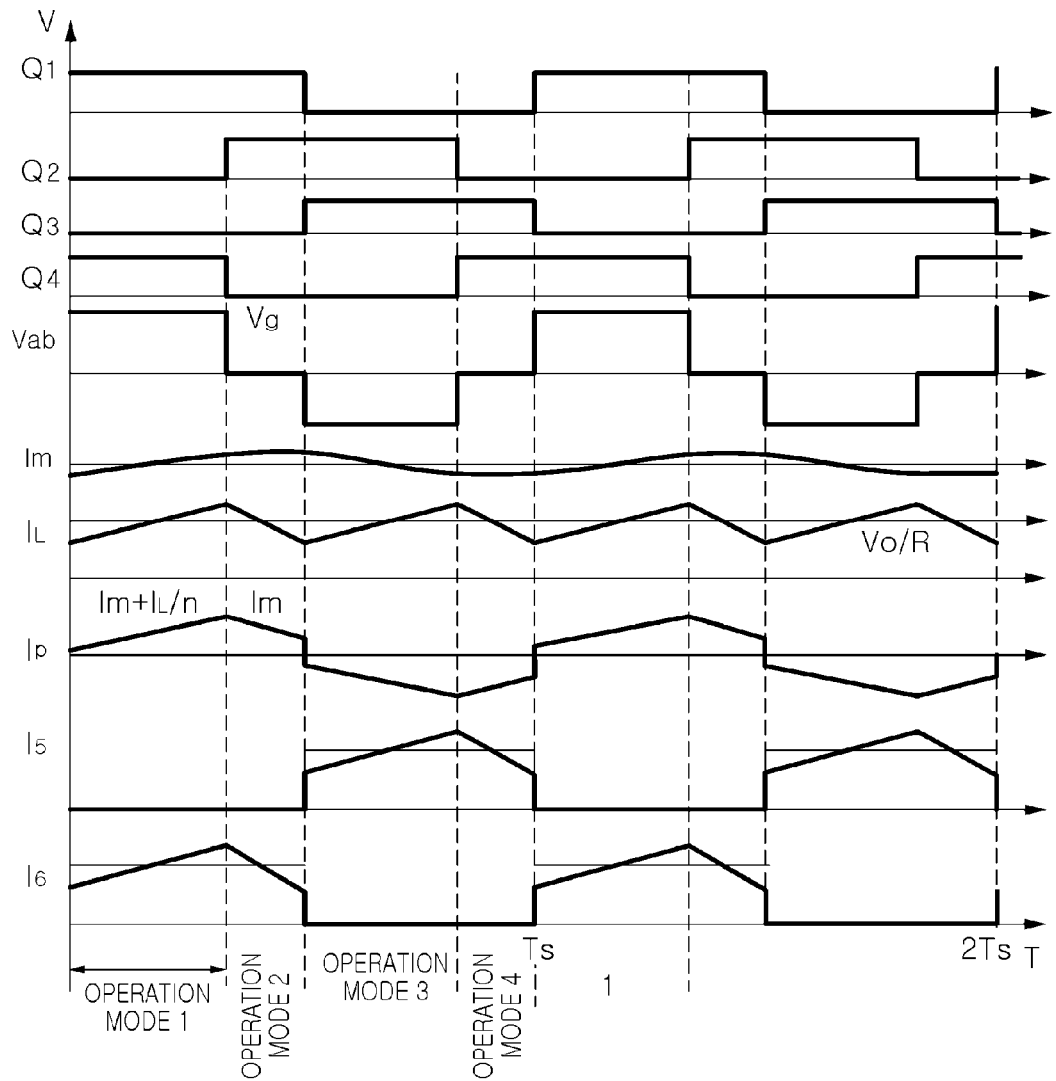
FIG. 3 is a graph illustrating operations of main parts of a driving apparatus according to an embodiment of the present invention.

FIG. 3 is a graph illustrating operations of main parts of an OLED driving apparatus according to an embodiment of the present invention.

Referring to FIGS. 2 and 3, in an operation mode 1, a first switch Q1 and a fourth switch Q4 of the switching part 121 are simultaneously conducted, and a first synchronous rectification element $D_{SA}$ of the rectification part 123 is conducted. A positive DC voltage is applied to the secondary winding $N_{S1}$ and $N_{S2}$ of the transformer 122, power is transmitted from the primary winding $N_P$ to the secondary winding $N_{S1}$ and $N_{S2}$, and a current $I_L$ of the inductor Lo is linearly increased. In the graph of FIG. 3, Im denotes a current flowing in a magnetic inductor, Vab denotes a voltage applied to the transformer 122, $I_P$ denotes a primary side current, and $I_5$ and $I_6$ denote a current flowing in the first and second synchronous rectification elements $D_{SA}$ and $D_{SB}$.

In an operation mode 2, the first switch Q1 and the second switch Q2 are simultaneously conducted, and a primary side of the transformer 122 is in a freewheeling state, so that a voltage of a secondary side of the transformer 122 is zero. Accordingly, a current $I_L$ flowing in an inductor winding is linearly reduced through the first synchronous rectification element $D_{SA}$ as shown in FIG. 3.

Operation modes 3 and 4 are the same as the above-described operation modes 1 and 2 except for a sign of an input voltage, and thus detailed descriptions thereof will be omitted.

Figure 4:
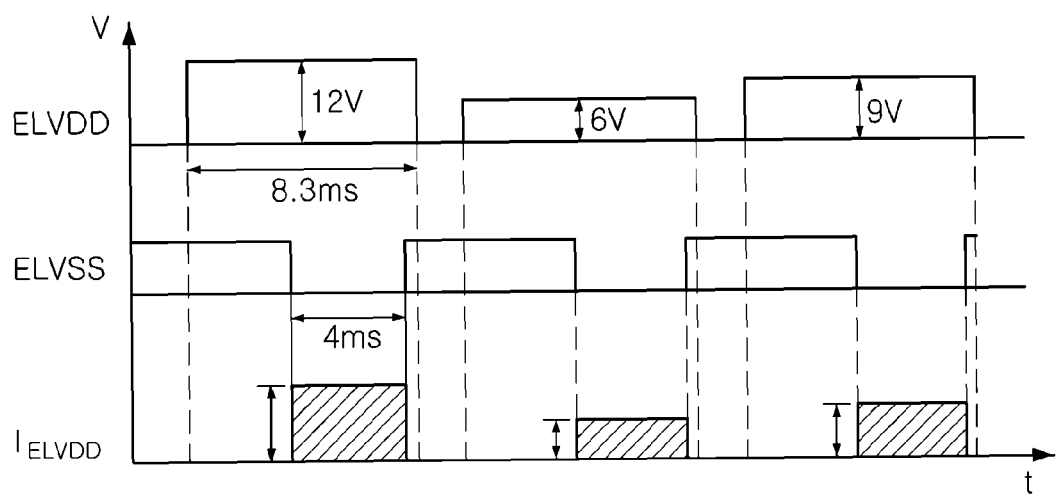
FIG. 4 is a graph illustrating a state in which a voltage level of a driving power is variable in accordance with a driving signal of a driving apparatus according to an embodiment of the present invention.

FIG. 4 is a graph illustrating a state in which a voltage level of a driving power is variable in accordance with a driving signal of an OLED driving apparatus according to an embodiment of the present invention.

Referring to FIGS. 2 and 4, the control part 124 may modulate a switching duty ratio of the four switches Q1, Q2, Q3, and Q4 of the switching part 121 using a PWM scheme so as to control a voltage level of the driving power ELVDD supplied to the OLED module.

In this case, an operation signal ELVSS having a predetermined on/off-time may be provided from the outside so as to drive the OLED module. Here, the operation signal ELVSS may be an active low signal, and a current flows into the OLED module at the time of off-time of the operation signal ELVSS to thereby emit light.

The brightness of the OLED module may be controlled by a driving signal within the OLED module, and the driving signal may be input to a non-inverted terminal of the comparison part 124a to thereby be participated in a control of the switching duty ratio of the four switches Q1, Q2, Q3, and Q4 of the switching part 121. Accordingly, when brightness in the OLED is adjusted to be lower, a voltage level applied to the OLED may be lowered, thereby reducing unnecessary power loss.

Figure 5:
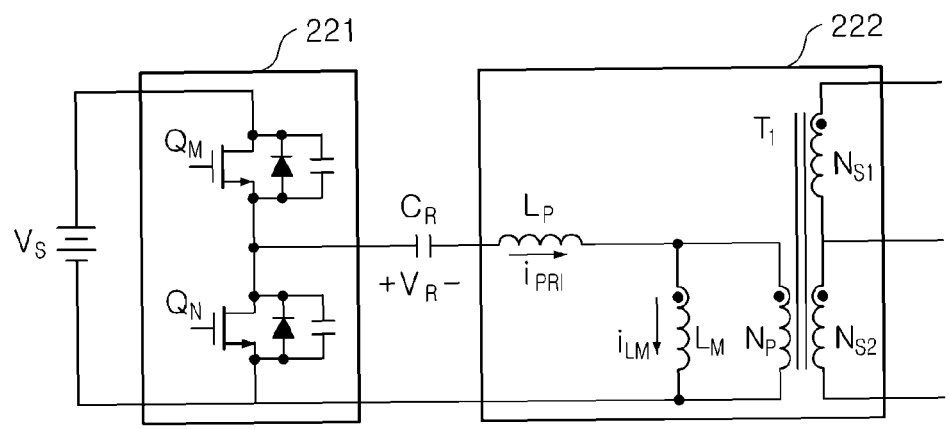
FIG. 5 illustrates another example of a switching part adopted in a driving apparatus according to an embodiment of the present invention.

FIG. 5 illustrates another example of a switching part adopted in an OLED driving apparatus according to an embodiment of the present invention.

Referring to FIG. 5, the switching part 121 of the OLED driving apparatus 100 according to an embodiment of the present invention may be configured in a half bridge structure having two switches $Q_M$ and $Q_N$.

The half bridge switch structure has been widely known, and thus detailed description thereof will be omitted.

As set forth above, according to embodiments of the present invention, an OLED driving apparatus does not adopt an additional DC/DC conversion terminal, but includes an AC/AC conversion terminal and a single DC/DC conversion terminal, so that power conversion efficiency may be increased, and a circuit size and manufacturing costs may be reduced.

In addition, when brightness in an OLED is adjusted to be lower, a voltage level applied to the OLED may be lowered, thereby reducing unnecessary power loss.

While the present invention has been shown and described in connection with the embodiments, it will be apparent to those skilled in the art that modifications and variations can be made without departing from the spirit and scope of the invention as defined by the appended claims.

What is claimed is:

1. A DC/DC converter, comprising:
    a DC/DC converter part converting an input power into a predetermined DC power by switching the input power to thereby supply the converted DC power to a light emitting device; and
    a control part controlling switching of the DC/DC converter part in accordance with driving power supplied to the light emitting device and a driving signal controlling brightness of the light emitting device to thereby control a voltage level of the DC power,
    wherein the control part includes:
        a comparison part comparing a predetermined reference signal with the DC power of the DC/DC converter part and a signal level of the driving signal, and
        a switching control part controlling switching of the DC/DC converter part in accordance with a comparison result of the comparison part.

2. The DC/DC converter of claim 1, wherein the DC/DC converter part includes:
    a switching part switching the input power in accordance with a switching control of the control part;
    a transformer having a primary winding receiving the switched power from the switching part, and a secondary winding having a predetermined winding ratio with regard to the primary winding and outputting a power transformed in accordance with the winding ratio; and
    a rectification part having a synchronous rectification element rectifying the transformed power from the secondary winding of the transformer.

3. The DC/DC converter of claim 2, wherein the control part is synchronized with a switching control of the switching part to thereby control ON/OFF switching of the synchronous rectification element of the rectification part.

4. The DC/DC converter of claim 3, wherein the switching control part controls the switching of the switching part of the DC/DC converter part and the switching of the synchronous rectification element of the DC/DC converter part in accordance with the comparison result of the comparison part.

5. The DC/DC converter of claim 3, wherein the control part controls switching-on duty of the switching part in accordance with on-time duty of the driving signal.

6. The DC/DC converter of claim 2, wherein the switching part has a phase shift full bridge (PSFB) switch structure or a half bridge switch structure.

7. A driving apparatus, comprising:
    a power factor correction part switching a rectified power to correct a power factor;
    a DC/DC converter part switching the power in which the power factor is corrected from the power factor correction part, and converting the switched power into a predetermined DC power to thereby supply the converted DC power to an organic light emitting diode (OLED); and
    a control part controlling switching of the DC/DC converter part in accordance with driving power supplied to the OLED and a driving signal controlling brightness of the OLED to thereby control a voltage level of the DC power,
    wherein the control part includes:
        a comparison part comparing a predetermined reference signal with the DC power of the DC/DC converter part and a signal level of the driving signal, and a switching control part controlling switching of the DC/DC converter part in accordance with a comparison result of the comparison part.

8. The driving apparatus of claim 7, wherein the DC/DC converter part includes:
- a switching part switching the power in which the power factor is corrected in accordance with a switching control of the control part,
- a transformer having a primary winding receiving the switched power from the switching part, and a secondary winding having a predetermined winding ratio with regard to the primary winding to thereby output a power transformed in accordance with the winding ratio, and
- a rectification part having a synchronous rectification element rectifying the transformed power from the secondary winding of the transformer.

9. The driving apparatus of claim 8, wherein the control part is synchronized with a switching control of the switching part to thereby control ON/OFF switching of the synchronous rectification element of the rectification part.

10. The driving apparatus of claim 9, wherein the switching control part controls the switching of the switching part of the DC/DC converter part and the switching of the synchronous rectification element of the DC/DC converter part in accordance with the comparison result of the comparison part.

11. The driving apparatus of claim 9, wherein the control part controls switching-on duty of the switching part in accordance with on-time duty of the driving signal.

12. The driving apparatus of claim 8, wherein the switching part has a phase shift full bridge (PSFB) switch structure or a half bridge switch structure.

* * * * *